US012602332B1

(12) United States Patent
Gelado Fernandez

(10) Patent No.: US 12,602,332 B1
(45) Date of Patent: Apr. 14, 2026

(54) DISTRIBUTED PAGE TABLE, MEMORY MAP AND ROUTING TABLE FOR MULTIPLE NODE COMPUTING SYSTEMS

(71) Applicant: NVIDIA Corporation, Santa Clara, CA (US)

(72) Inventor: Isaac Gelado Fernandez, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/911,365

(22) Filed: Oct. 10, 2024

(51) Int. Cl.
 *G06F 12/1072* (2016.01)
(52) U.S. Cl.
 CPC .............................. *G06F 12/1072* (2013.01)
(58) Field of Classification Search
 CPC .................................................. G06F 12/1072
 See application file for complete search history.

(56) References Cited

U.S. PATENT DOCUMENTS

2013/0159638 A1* 6/2013 Koinuma ............ G06F 12/1441
                                           711/E12.001

2021/0294746 A1* 9/2021 Yudanov ............. G06F 12/1009
2022/0283936 A1* 9/2022 Yudanov ................. G06F 9/544

OTHER PUBLICATIONS

Gelado, I., et al., "A Distributed Virtual Address Space for Multi-Node Systems," 2022.
Reinhardt, S.K., et al., "Tempest and Typhoon: User-Level Shared Memory," In Proceedings of the 21st Annual International Symposium on Computer Architecture (ISCA '94), IEEE Computer Society Press, Washington, DC, USA, 1994 IEEE, pp. 325-336.

* cited by examiner

*Primary Examiner* — Chie Yew
(74) *Attorney, Agent, or Firm* — Leydig, Voit & Mayer, Ltd.

(57) ABSTRACT

The present disclosure relates to a shared virtual address space for multi-node computing systems. The shared virtual address space includes a plurality of virtual addresses (e.g. virtual memory pages). A distributed, shared physical memory of the multi-node computing system is formed by combining the physical memory resources of the plurality of nodes. The shared virtual address space enables different nodes of a multi-node computing system to maintain an identical assignment of virtual addresses to physical memory addresses.

20 Claims, 16 Drawing Sheets

DISTRIBUTED PAGE TABLE, MEMORY MAP AND ROUTING TABLE FOR MULTIPLE NODE COMPUTING SYSTEMS

TECHNICAL FIELD

The present disclosure pertains to computer memory. At least one embodiment pertains to a distributed virtual address space that enables different nodes of a multi-node computing system to maintain an identical assignment of virtual addresses to physical memory addresses.

BACKGROUND

Multi-node computing systems include clustered networks of multiple interconnected nodes, each including one or more processors, that work together to perform complex tasks. In such systems, each node may contain both a CPU and one or more GPUs. The CPUs handle general-purpose computing tasks while the GPUs, which typically have a large number of individual cores and are optimized for parallel processing, handle tasks that require more substantial computational throughput. Large numbers of GPUs can be interconnected to create vast multi-node systems with immense computational power. GPUs within a single node can be interconnected via high-speed interfaces designed to maximize data throughput and minimize latency. GPUs across different rack enclosures can be interconnected using high-speed networking technologies.

In recent years, multi-node systems have become indispensable for handling complex computational tasks in modern data center environments. Due to their ability to distribute workloads across multiple processors in parallel, multi-node systems can significantly enhance computational speed and efficiency. In particular, multi-node systems are well-suited for a variety of compute-intensive applications, including artificial intelligence (AI)/machine learning, high-performance computing (HPC), and graphics rendering.

In AI and machine learning, multi-node systems enable the training of complex models on massive datasets. Multi-node systems are especially well suited for training deep neural networks (DNNs), as their parallel processing capabilities enable them to significantly reduce the time needed to train accurate models. Multi-node systems are also well suited for HPC applications, such as scientific simulations, weather forecasting, and financial modeling. By distributing workloads across multiple nodes, immense computational power can be employed to implement complex algorithms and to process and analyze large datasets, leading to quicker insights and more accurate predictions. Large-scale image processing and 3D rendering tasks also benefit from multi-node systems, which can handle the parallel nature of rendering tasks efficiently, thereby producing high-quality graphics and visual effects in a fraction of the time it would take a single GPU or CPU.

An important aspect of multi-node systems is that interconnections between nodes allow the processors of one node to access the memory of other nodes. Shared memory access can be facilitated through technologies such as Non-Uniform Memory Access (NUMA) in CPU-based systems and GPU Direct technology in GPU-based systems. In AI and machine learning, shared memory access enables efficient data sharing and ensures that models can be trained on larger datasets without significant overhead. In HPC applications, shared memory access allows for more efficient handling of large-scale computations and datasets, and in graphics rendering, allows seamless data transfer and resource sharing, thereby improving rendering speed and quality. While providing shared memory access offers significant advantages, different nodes have their own caches and run different operating system (OS) images. This creates challenges related to the interoperability of different nodes. To further enhance the performance of multi-node systems, there is a need to address such challenges.

SUMMARY

The present disclosure relates to a shared virtual address space for multi-node computing systems. The shared virtual address space includes a plurality of virtual addresses (e.g. virtual memory pages). A distributed, shared physical memory of the multi-node computing system is formed by combining the physical memory resources of the plurality of nodes. The shared virtual address space enables different nodes to maintain an identical assignment of virtual addresses to physical memory addresses.

According to an aspect of the present disclosure, a multi-node computing system is configured to maintain a shared virtual address space. The multi-node node computing system includes a plurality of nodes. Each respective node of the plurality of nodes includes processing circuitry configured to: maintain a respective subset of a distributed page table, the distributed page table providing a mapping of virtual addresses of the shared virtual address space to physical memory locations of a distributed physical memory, maintain a respective subset of a distributed virtual memory map, the distributed virtual memory map providing, for each respective virtual address in the shared virtual address space, an indication of whether the respective virtual address is in use or available, and maintain a routing table storing a node ID and a network address of at least one other node of the plurality of nodes. Each respective node of the plurality of nodes further includes memory configured to store the respective subset of the distributed page table and the respective subset of the distributed virtual memory map.

According to an aspect of the present disclosure, a computing node is provided for a multi-node computing system configured to maintain a shared virtual address space. The computing node includes a central processing unit (CPU), configured to: maintain a respective subset of a distributed page table, the distributed page table providing a mapping of virtual addresses of the shared virtual address space to physical memory locations of a distributed physical memory, maintain a respective subset of a distributed memory map, the distributed memory map providing, for each respective virtual address in the shared virtual address space, an indication of whether the respective virtual address is in use or available, and maintain a routing table storing a node ID and a network address of at least one other node of the plurality of nodes. The computing node further includes a network interface configured to communicate with a CPU of at least one additional computing node.

According to an aspect of the present disclosure, a method is provided for sharing a virtual address space for a multi-node computing system including a plurality of nodes, each respective node of the plurality of nodes including one or more processors and a respective physical memory. The method includes providing a first distributed data structure, the first distributed data structure being configured to maintain a mapping of virtual addresses of the shared virtual address space to physical memory locations in a shared physical memory. The method further includes providing a second distributed data structure, the second distributed data structure being configured to store, for each virtual address in the shared virtual address space, a status. The providing the first distributed data structure comprises assigning, to each respective node of the plurality of nodes, a respective subset of the first distributed data structure, and the providing the second distributed data structure comprises assigning, to each respective node of the plurality of nodes, a respective subset of the second distributed data structure.

BRIEF DESCRIPTION OF THE DRAWINGS

Systems and methods that relate to a shared virtual address space for multi-node computing systems are described in detail below with reference to the attached drawing figures, wherein.

DETAILED DESCRIPTION

Figure 1A:
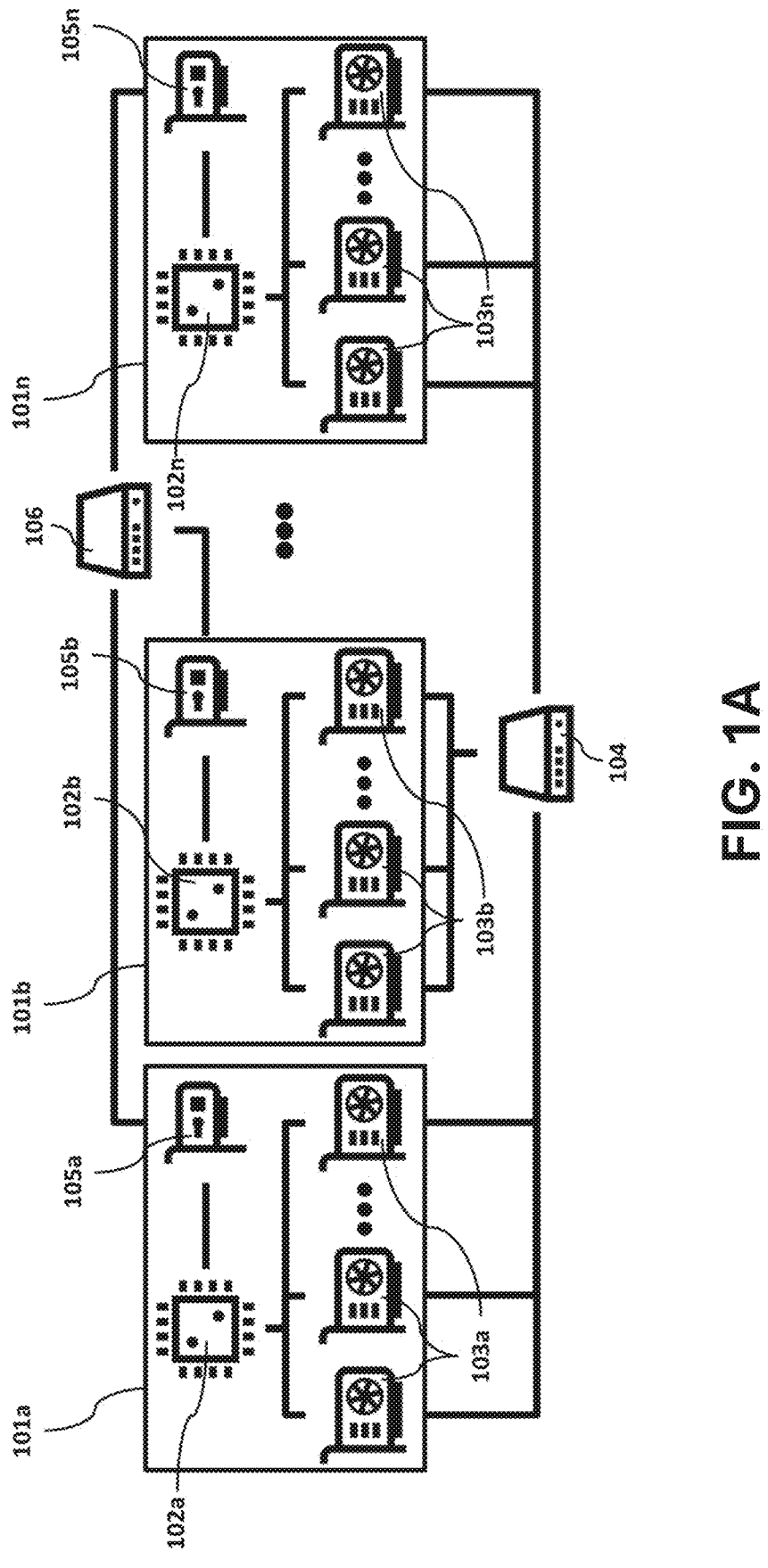
FIG. 1A illustrates a block diagram of an example multi-node computing system suitable for use in implementing certain embodiments of the present disclosure.

Systems and methods are disclosed herein that relate to a shared virtual address space for multi-node computing systems. The shared virtual address space includes a plurality of virtual addresses (e.g. virtual memory pages). A distributed, shared physical memory of the multi-node computing system is formed by combining the physical memory resources of a plurality of nodes. The systems and methods disclosed herein allow a set of processes running on different operating system (OS) images to agree on the state and mappings of virtual addresses.

In conventional multi-node computing systems in which each node contains both a CPU and one or more GPUs, the physical memory resources of each CPU and/or GPU can be shared with the other CPUs and/or GPUs in the system. However, in such conventional multi-node systems, different virtual addresses will be assigned to the same physical memory locations by different nodes. This is because different nodes run different OS images, and the virtual addresses are assigned to physical memory locations through a coordinated effort between the OS images and the computer hardware on which OS image runs. Inconsistent assignment of virtual addresses to physical memory locations poses interoperability problems, such as not supporting sharing of data structures whose fields contain virtual memory addresses (e.g. pointers) or requiring explicit mapping of remote memory in order to access it. In contrast to conventional multi-node computing systems and methods, the systems and methods of the present disclosure enable different nodes running different OS images to maintain an identical assignment of virtual addresses to physical memory addresses.

A multi-node computing system includes a plurality of individual nodes. Each individual node can include a CPU and one or more GPUs, as well as physical memory resources. A distributed, shared physical memory of the multi-node computing system is made up of the physical memory resources of the individual nodes. Systems and methods of the present disclosure provide a shared virtual address space for the multi-node computing system. The systems and methods provide a first data structure in the form of a distributed page table that maintains a mapping of virtual addresses (i.e. pages) of the shared virtual address space to physical memory addresses (i.e. frames) of the shared physical memory. In addition, the systems and methods provide a second data structure that maintains a status of the virtual addresses of the shared virtual address space. Specifically, the second data structure is a distributed memory map that indicates, for each respective virtual address of the virtual address space, whether the respective virtual address is (a) allocated—i.e. assigned to a process (e.g. an MPI process), or (b) unallocated—i.e. not assigned any process.

The distributed page table provides virtual to physical address translations. Each entry in the distributed page table corresponds to a virtual address (i.e. a virtual memory page) and contains information about the location of that virtual memory page in the distributed, shared physical memory (i.e. a physical memory frame). In embodiments, the distributed page table is provided in the form of a distributed hash table. The distributed hash table is collectively maintained by the plurality of nodes of the multi-node computing system. The shared memory map indicates ranges of virtual addresses that are allocated, i.e. in use, and ranges of virtual addresses that remain unallocated, i.e. are free. In embodiments, the shared memory map is provided in the form of a distributed trie that is collectively maintained by the plurality of nodes of the multi-node computing system.

According to a first aspect, the present disclosure provides a multi-node computing system configured to maintain a shared virtual address space. The multi-node node computing system includes a plurality of nodes. Each respective node of the plurality of nodes includes processing circuitry configured to: maintain a respective subset of a distributed page table, the distributed page table providing a mapping of virtual addresses of the shared virtual address space to physical memory locations of a distributed physical memory, maintain a respective subset of a distributed virtual memory map, the distributed virtual memory map providing, for each respective virtual address in the shared virtual address space, an indication of whether the respective virtual address is in use or available, and maintain a routing table storing a node ID and a network address of at least one other node of the plurality of nodes. Each respective node of the plurality of nodes further includes memory configured to store the respective subset of the distributed page table and the respective subset of the distributed virtual memory map.

In an embodiment of the system according to the first aspect, the shared page table is a distributed hash table, and the shared memory map is a distributed trie. In at least one embodiment, the respective subset of the distributed hash table and the respective subset of the distributed trie are maintained by a kernel-level component of an operating system of the respective node, and the respective subset of the distributed page table and the respective subset of the distributed memory map are stored in a kernel space of the memory.

In an embodiment of the system according to the first aspect, the shared physical memory comprises physical memory of each respective node of the plurality of nodes. In at least one embodiment, the processing circuitry configured to maintain the subset of the distributed page table and the subset of the distributed memory map is a central processing unit (CPU). In at least one embodiment, each respective node of the plurality of nodes further comprising a network interface, the multi-node computing system further comprising a network switch configured to interconnect CPUs of different respective nodes.

In an embodiment of the system according to the first aspect, each respective node of the plurality of nodes comprising a plurality of graphics processing units (GPUs). In at least one embodiment, the system further includes a GPU interconnect switch configured to interconnect GPUs of different respective nodes.

According to a second aspect, the present disclosure provides a computing node for a multi-node computing system configured to maintain a shared virtual address space. The computing node includes a central processing unit (CPU), configured to: maintain a respective subset of a distributed page table, the distributed page table providing a mapping of virtual addresses of the shared virtual address space to physical memory locations of a distributed physical memory, maintain a respective subset of a distributed memory map, the distributed memory map providing, for each respective virtual address in the shared virtual address space, an indication of whether the respective virtual address is in use or available, and maintain a routing table storing a node ID and a network address of at least one other node of the plurality of nodes. The computing node further includes a network interface configured to communicate with a CPU of at least one additional computing node.

In an embodiment of the computing node according to the second aspect, the shared page table is a distributed hash table, and the shared memory map is a distributed trie. In at least one embodiment, the respective subset of the distributed hash table and the respective subset of the distributed trie are maintained by a kernel-level component of an operating system of the respective node, and the respective subset of the distributed page table and the respective subset of the distributed memory map are stored in kernel space.

In an embodiment of the computing node according to the second aspect, the CPU is configured to construct the routing table via a bootstrapping process. The bootstrapping process includes broadcasting a master node identity request message, receiving a message indicating a routing address and a node ID of a master node, computing a distance to the master node, and storing, in the routing table and based on the distance to the master node, the routing address and the node ID of the master node.

In an embodiment of the computing node according to the second aspect, the computing node further includes a plurality of graphics processing units (GPUs), wherein the plurality of GPUs is interconnected via GPU interconnects. In at least one embodiment, the plurality of GPUs is configured to be further interconnected to GPUs of at least one additional computing node.

According to a third aspect, the present disclosure provides a method for sharing a virtual address space for a multi-node computing system including a plurality of nodes, each respective node of the plurality of nodes including one or more processors and a respective physical memory. The method includes providing a first distributed data structure, the first distributed data structure being configured to maintain a mapping of virtual addresses of the shared virtual address space to physical memory locations in a shared physical memory. The method further includes providing a second distributed data structure, the second distributed data structure being configured to store, for each virtual address in the shared virtual address space, a status. The providing the first distributed data structure comprises assigning, to each respective node of the plurality of nodes, a respective subset of the first distributed data structure, and the providing the second distributed data structure comprises assigning, to each respective node of the plurality of nodes, a respective subset of the second distributed data structure.

In an embodiment of the method according to the third aspect, the first distributed data structure is a shared page table in the form of a distributed hash table and the second distributed data structure is a shared memory map in the form of a distributed trie. In at least one embodiment, each respective subset of the distributed hash table and each respective subset of the distributed trie are maintained by a kernel-level component of an operating system of the respective node to which said respective subsets are assigned.

FIG. 1A illustrates a block diagram of an example multi-node computing system 100 suitable for use in implementing certain embodiments of the present disclosure. The multi-node computing system 100 includes a plurality of nodes 101a, 101b, . . . , 101n. Each node includes a central processing unit (CPU) (102a, 102b, . . . , 102n) and a plurality of graphics processing units (GPUs) (103a, 103b, . . . , 103n). The plurality of GPUs of each node (e.g. the plurality of GPUs 103a) are interconnected via high-speed NVLink interconnect. However, embodiments of the present disclosure may also utilize alternative interconnects (e.g. PCI Express (PCIe) or AMD's proprietary xGMI interconnect). The multi-node computing system 100 additionally includes an NVSwitch 104 that connects GPUs of different nodes (e.g. the GPUs 103a and the GPUs 103b).

However, embodiments of the present disclosure may also utilize alternative networking technologies (e.g. Ethernet, InfiniBand, or Intel's proprietary Omni-Path) to connect GPUs of different nodes. Each node 101a, 101b, . . . , 101n additionally includes a network interface (105a, 105b, . . . , 105n) which can be, e.g., a network interface card, and the multi-node computing system 100 further includes a network switch 106, which can be, e.g., an InfiniBand or Ethernet switch. The network interfaces (105a, 105b, . . . , 105n) and the network switch 106 communicate via a networking technology such as Ethernet or InfiniBand.

Figure 1B:
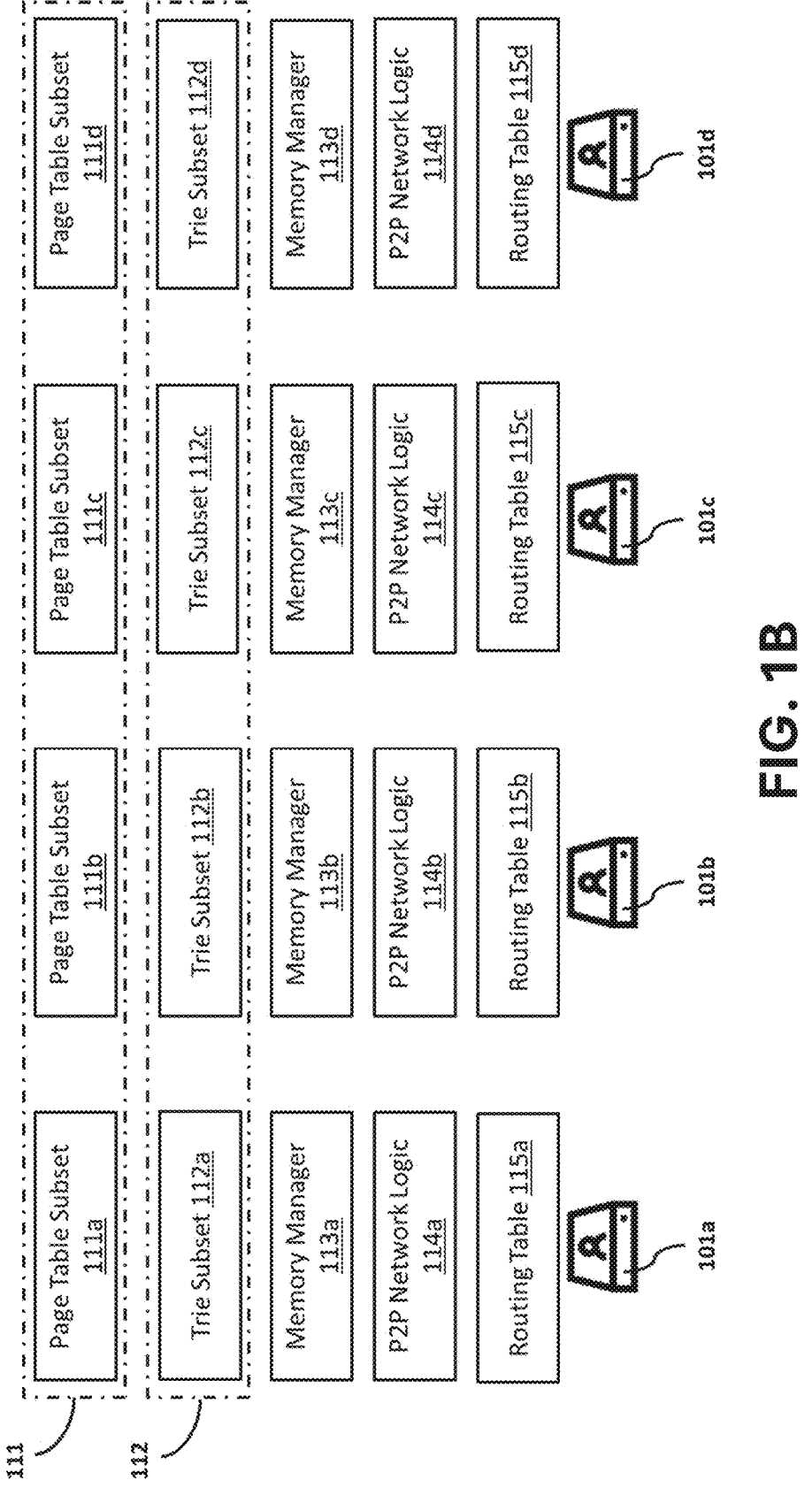
FIG. 1B illustrates a block diagram of a plurality of nodes of a multi-node computing system suitable for maintaining a shared virtual address space according to certain embodiments of the present disclosure.

FIG. 1B illustrates a block diagram of a plurality of nodes of a multi-node computing system suitable for maintaining a shared virtual address space according to certain embodiments of the present disclosure. The nodes 101a, 101b, 101c, and 101d collectively maintain both (a) a distributed page table in the form of a distributed hash table 111 and (b) a distributed virtual memory map in the form of a distributed trie 112. The distributed hash table 111 provides a mapping of virtual addresses of the shared virtual address space to physical memory locations of a distributed physical memory, and the distributed trie 112 provides, for each respective virtual address in the shared virtual address space, an indication of whether the respective virtual address is allocated or unallocated. In order to collectively maintain the distributed page table 111 and the distributed trie 112, each respective node 101a, 101b, 101c, and 101d maintains a respective subset of the distributed page table (i.e. subsets 111a, 111b, 111c, and 111d) and a respective subset of the distributed trie (i.e. subsets 112a, 112b, 112c, and 112d). To maintain its respective subset of the distributed page table 111 and its respective subset of the distributed trie 112, each respective node 101a, 101b, 101c, and 101d further includes a respective memory manager (i.e. memory managers 113a, 113b, 113c, and 113d). Each respective memory manager comprises logic configured to interact with the distributed page table 111 and the distributed trie 112 in order to maintain (i) mappings between the shared virtual address space and the shared physical memory and (ii) a record of allocations of virtual memory addresses. Specifically, each respective memory manager includes logic configured to perform operations, e.g. insert/remove/lookup, on the corresponding subset of the distributed page table (i.e. subsets 111a, 111b, 111c, and 111d) and/or a subset of the distributed hash table maintained by a different node. In addition, each respective memory manager includes logic configured to perform memory allocation by adding/updating/merging entries in the corresponding subset of the distributed trie (i.e. subsets 112a, 112b, 112c, and 112d) and/or a subset of the distributed trie maintained by a different node (i.e. for out-of-node virtual memory allocations). To communicate information stored in its respective subset of the distributed page table 111 and its respective subset of the distributed trie 112—and to facilitate internodal updates thereto, each respective node 101a, 101b, 101c, and 101d further includes respective peer-to-peer (P2P) network interface logic (i.e. network interface logic components 114a, 114b, 114c, and 114d). Each respective peer-to-peer network logic components maintains a routing table (i.e. routing tables 115a, 115b, 115c, and 115d) that stores a list of nodes (indexed by their distance from the respective node, e.g. 101a, that maintains the respective routing table, e.g. 115a) and a corresponding network address for each node in the list.

Figure 1C:
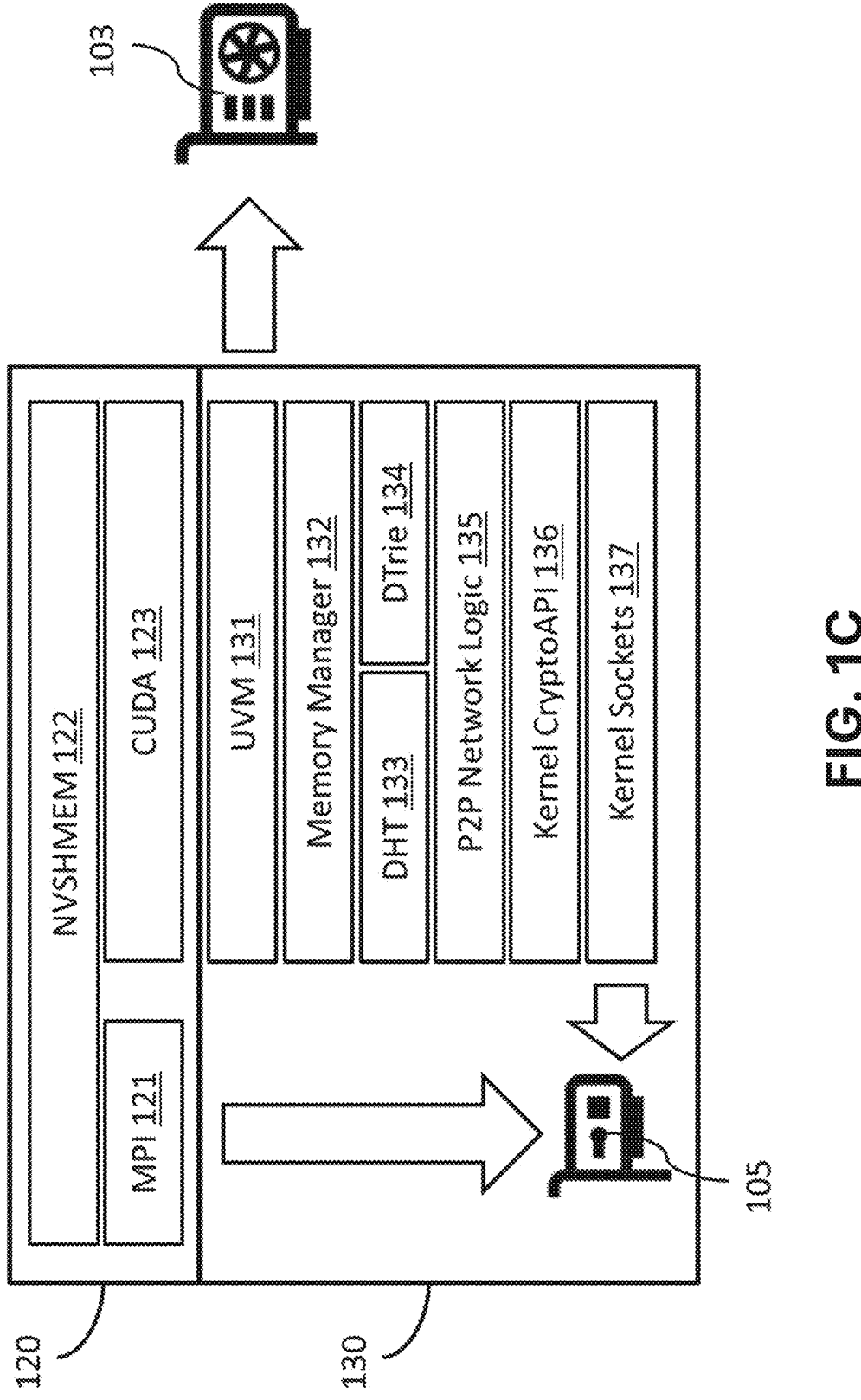
FIG. 1C illustrates a block diagram of software components for a computing node suitable for maintaining a shared virtual address space according to certain embodiments of the present disclosure.

FIG. 1C illustrates a block diagram of software components for a computing node suitable for maintaining a shared virtual address space according to certain embodiments of the present disclosure. The computing node 101 (which can be, e.g., any of the plurality of nodes 101a, 101b, . . . , 101n of FIG. 1A) has an operating system that provides a user space 120 and a kernel space 130. The user space 120 provides an environment for running code of regular application programs (e.g. MPI process 121) and user interfaces, and the user space 120 further provides user-level tools, including NVSHMEM software library 122 and Compute Unified Device Architecture (CUDA) toolkit 123. The NVSHMEM software library 122 accelerates parallel computing applications by providing support for GPU-to-GPU communication and allocation of GPU memory for access by multiple GPUs in a GPU cluster (e.g., a cluster of multiple GPUs of the GPUs 103a, 103b, . . . , 103n of FIG. 1A). The CUDA toolkit 123 provides GPU-accelerated libraries, debugging and optimization tools, a compiler, and a runtime library for implementing parallel processing on one or more GPUs. While FIG. 1C illustrates a user space having particular components, embodiments of the present disclosure may also be carried out by individual computing nodes that do not include such components as well as by a multi-node computing system made up of a plurality of such computing nodes.

The kernel space 130 provides for direct control over the hardware of the computing node 101, i.e. over the CPU 102, the plurality of GPUs 103, and the network interface 105. The kernel space 130 provides unified virtual memory 131, which can be accessed by the plurality of GPUs 103 of the node 101). In addition, the kernel space 130 provides a memory manager 132 (which can be, e.g., one of the memory managers 113a, 113b, 113c, and 113d as described in FIG. 1B), a subset of a distributed hash table 133 (which can be, e.g., one of the respective subsets 111a, 111b, 111c, and 111d of the distributed page table 111 described in FIG. 1B), and a subset of a distributed trie 134 (which can be, e.g., one of the respective subsets 112a, 112b, 112c, and 112d of the distributed trie 112 described in FIG. 1B). The kernel space 130 also provides peer-to-peer (P2P) network logic 135 (which can be, e.g., logic provided by one of network logic components 114a, 114b, 114c, and 114d described in FIG. 1B) for communicating with other nodes in the multi-node computing system (e.g. the multi-node computing system 100 of FIG. 1A) via the network interface 105. In addition, the kernel space 130 includes a kernel cryptographic application programming interface (API) 136 configured to provide encryption and decryption operations (e.g. for messages exchanged via the P2P network) and various kernel sockets 137 (e.g. for facilitating efficient communication via the P2P network).

Figure 2A:
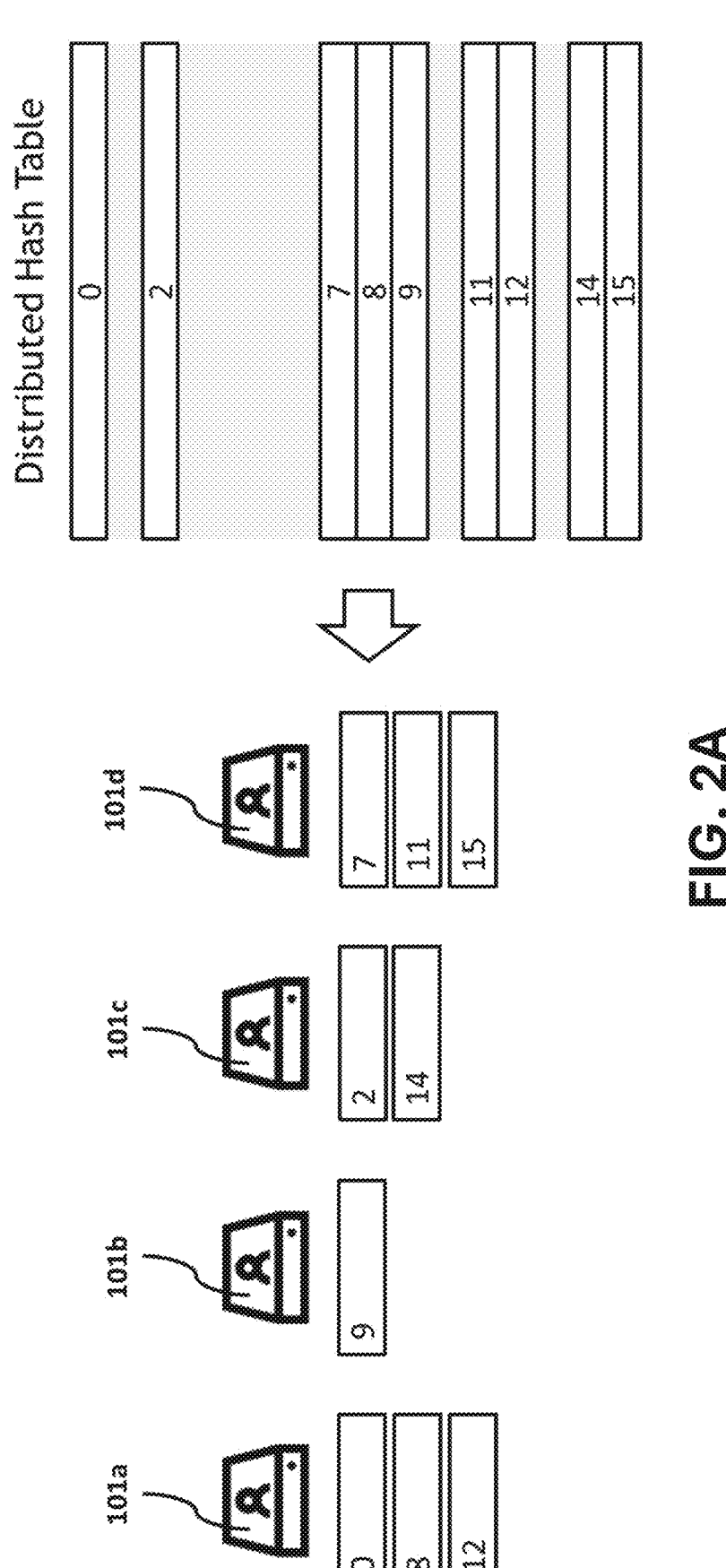
FIG. 2A illustrates the division of a shared virtual address space among a plurality of nodes according to certain embodiments of the present disclosure.

FIG. 2A illustrates the division of a shared virtual address space among a plurality of nodes 101a, 101b, 101c, and 101d according to certain embodiments of the present disclosure. To provide and maintain a shared virtual address space, a range of virtual addresses is predefined. Each virtual address corresponds to a key, i.e. a hash value, in a keyspace. As different nodes appear in the multi-node computing system (e.g. on the P2P network described in FIG. 1C), they are assigned different portions of the shared virtual address space. Specifically, each respective node is assigned a respective subset of the virtual address space—which corresponds to a respective subset of the keyspace. A hashing algorithm—which is consistent across all nodes—maps virtual addresses of the virtual address space to the keyspace. Thus, each respective node is assigned a subset of the keyspace and can be said to "own" the individual keys within said subset of the keyspace. Upon removal or addition of a node, only the set of keys owned by nodes with adjacent IDs is changed. If the hashing algorithm implements consistent hashing, the keyspace is a ring. Alternatively, the hashing function may implement rendezvous hashing. The keyspace properties depend on the hashing algorithm that is used.

Each respective node is also assigned an identifier within the keyspace (i.e. a "node ID"), said identifier being equal to the highest value key of the keyspace assigned to the respective node. In this manner, the keyspace is distributed among the plurality of nodes such that each respective node is responsible for storing virtual memory address-physical memory address pairs that map, in the keyspace, from a previous node's identifier to the respective node's own identifier. Each respective node is thereby assigned a respective subset of a distributed hash table to maintain, the respective subset of the distributed hash table corresponding to the subset of the keyspace that corresponds to the portion of the shared virtual address space assigned to the respective node. The distributed hash table is configured such that it can include an entry for each key (i.e. hash value), and therefore, an entry for each virtual address in the shared virtual address space. The entry identifies a physical memory address that corresponds to the virtual memory address corresponding to the key. For example, each key can correspond to a virtual memory page, and each entry in the distributed hash table identifies a physical memory frame corresponding to said virtual memory page.

In the illustration provided by FIG. 2A, virtual memory pages 0 through 15 are distributed between the plurality of nodes 101a, 101b, 101c, and 101d such that each of the nodes is responsible for storing virtual address-physical memory address pairs for certain virtual memory pages of the virtual address space. Specifically, node 101a is responsible for storing a physical memory location that corresponds to virtual memory pages 0, 8, and 12; node 101b is responsible for storing a physical memory location that corresponds to virtual memory page 9, node 101c is responsible for storing a physical memory location that corresponds to virtual memory pages 2 and 14; and node 101d is responsible for storing a physical memory location that corresponds to virtual memory pages 7, 11, and 15.

Figure 2B:
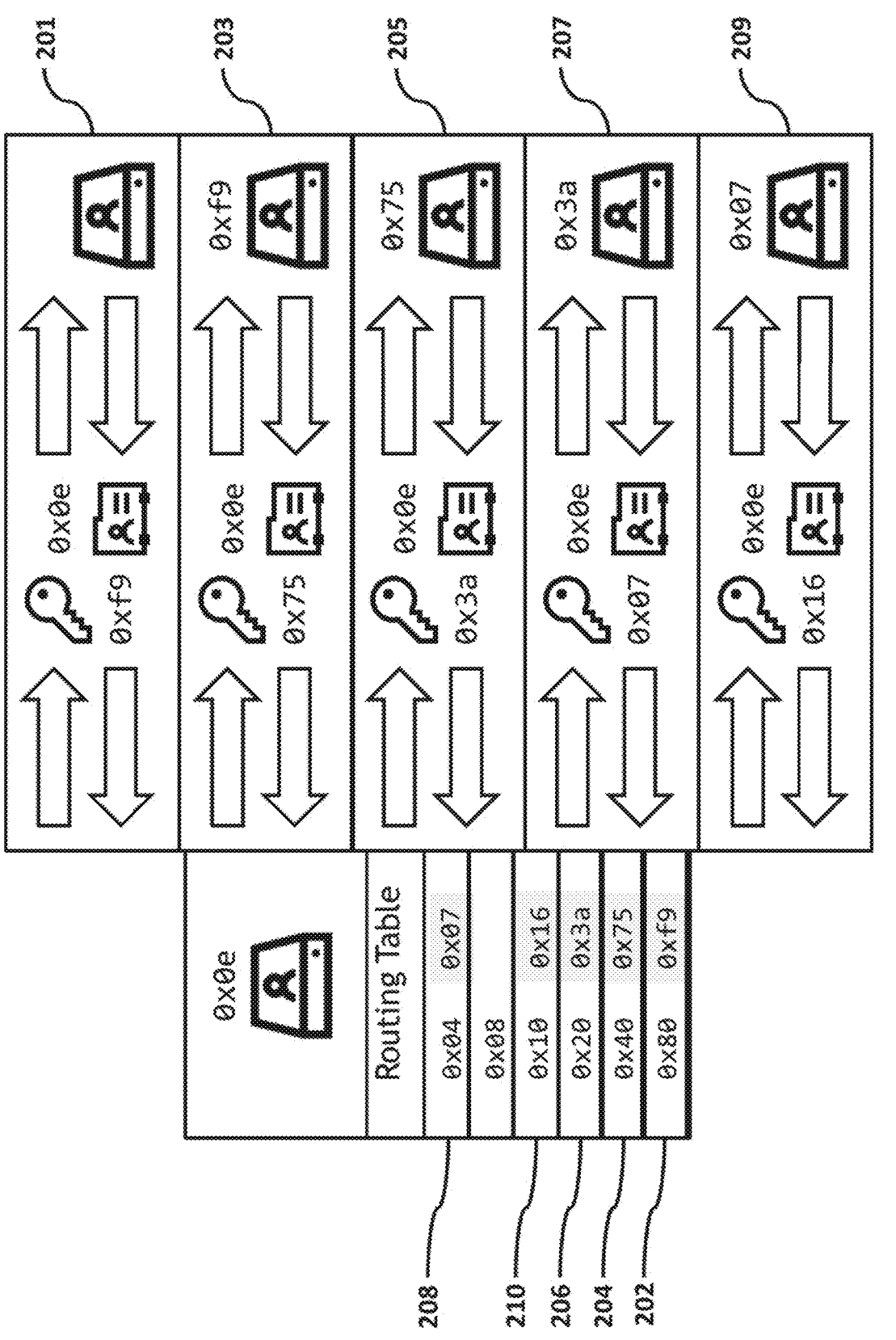
FIG. 2B illustrates a node location and discovery process according to certain embodiments of the present disclosure, performed by a particular node of a multi-node computing system, to generate a routing table.

FIG. 2B illustrates a node location and discovery process according to certain embodiments of the present disclosure, performed by a particular node of a multi-node computing system, to generate a routing table. The routing table facilitates communication between nodes in the multi-node computing system for maintaining a shared virtual address space. The routing table stores a list of nodes (i.e. pairs of node IDs and network addresses for each of a plurality of nodes in the multi-node system), which are indexed by their distance from the particular node. The node location and discovery process illustrated in FIG. 2B is performed by exchanging messages via the P2P network described in FIG. 1C. Thereafter, once a node has identified a network address of a node owning a given key, messages can be sent directly to such node.

At 201, the particular node (i.e. node 0x0e) broadcasts a master node identity request message to other nodes connected thereto via a P2P communication network, and the node 0x0e receives a response to the master node identity request message that includes a node ID for the master node (i.e. node 0xf9 in FIG. 2B) and a network address for the master node. At 202, the node 0x0e computes a distance to the master node and creates an entry in its routing table, indexed by the computed distance, for the master node. To provide for efficient lookup, i.e. of a node responsible for storing a virtual memory address-physical memory address pair in the shared page table, consecutive distance indices in each node's routing table correspond to exponentially increasing distances in the keyspace, such that any node can be located in at most log(n) steps, where n is the distance in the keyspace. The entry for the master node includes the node ID of the master node and the network address for the master node. The network address can be, e.g., a MAC address.

At 203, node 0x0e transmits, to the master node 0xf9, a location request message requesting its own location and node 0x0e receives, from the master node 0xf9, a message including a node ID for node 0x75 and a network address for node 0x75. At 204, node 0x0c computes a distance to the node 0x75 and creates an entry for the node 0x75 in its routing table (including a node ID and network address), indexed by the computed distance to node 0x75. At 205, node 0x0e transmits, to node 0x75, a location request message requesting its own location and node 0x0e receives, from node 0x75, a message including a node ID for node 0x3a and a network address for node 0x3a. At 206, node 0x0e computes a distance to node 0x3a and creates an entry for node 0x3a in its routing table (including a node ID and network address), indexed by the computed distance to node 0x3a. At 207, node 0x0e transmits, to node 0x3a, a location request message requesting its own location and node 0x0e receives, from node 0x3a, a message including a node ID for node 0x07 and a network address for node 0x07. At 208, node 0x0c computes a distance to node 0x07 and creates an entry for node 0x07 in its routing table (including a node ID and network address), indexed by the computed distance to node 0x07.

At 209, node 0x0e transmits, to node 0x07, a location request message requesting its own location and node 0x0e receives, from node 0x07, a message including a node ID for node 0x16 and a network address for node 0x16. At 210, node 0x0e computes a distance to node 0x16 and creates an entry for node 0x16 in its routing table (including a node ID and network address), indexed by the computed distance to 0x16, and then the process terminates in response to a determination that the distance to node 0x16 is greater than the distance to node 0x07.

Figure 2C:
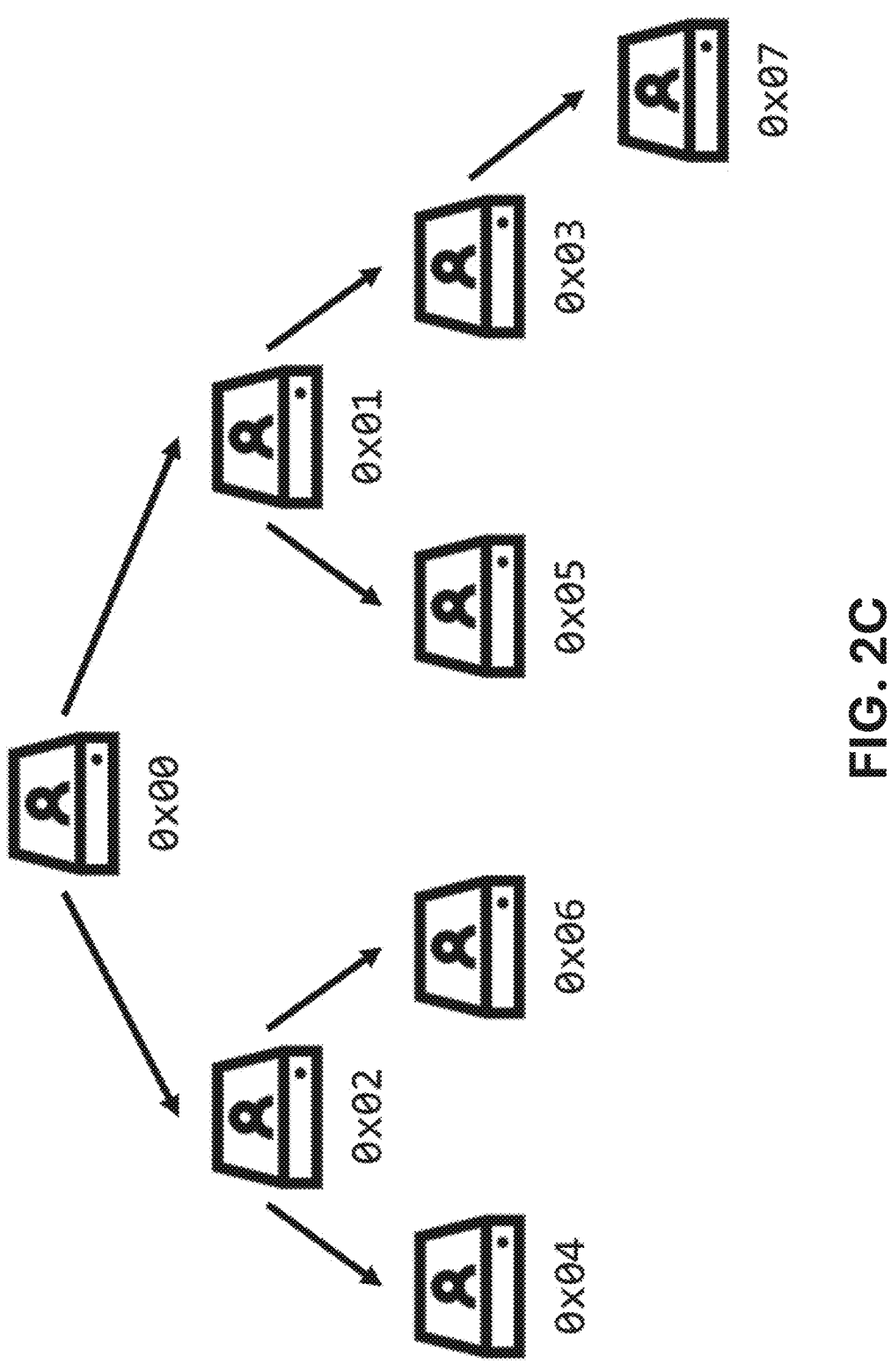
FIG. 2C illustrates a node hierarchy, according to certain embodiments of the present disclosure, established by a bootstrapping process performed in a multi-node computing system.

FIG. 2C illustrates a node hierarchy, according to certain embodiments of the present disclosure, established by a bootstrapping process performed in a multi-node computing system. The node hierarchy is established during an initialization stage of a process for creating a distributed trie that maintains a record of allocations of virtual memory addresses in a shared virtual address space for a multi-node computing system (e.g. the distributed trie 112 of FIG. 1B). Each node in the hierarchy (except the root node) has a single parent node and no more than two child nodes. As in the case of the distributed hash table, each node of the plurality of nodes (i.e. nodes 0x00 through 0x07 in FIG. 2C) is assigned a portion of the shared virtual address space (i.e. a range of virtual address that corresponds to a subspace of the keyspace) for which it is responsible for maintaining a record of allocations. The split of the shared virtual address space can be different for the page table and the trie, i.e. the virtual address space can be distributed amongst the various nodes in in one way for the hash table and then distributed amongst the various nodes in a second way for the trie. Therefore, virtual addresses corresponding to the hash table maintained by a particular node do not necessarily match the same virtual addresses corresponding to the trie maintained by the same node. As in the case of the distributed hash table, each node of the plurality of nodes can communicate with the owner of a given key by exchanging messages via the P2P network described in FIG. 1C. In at least one embodiment, the node ID of the parent and children are stored inside each trie node, and the routing table maintained by each node is utilized to obtain the network addresses for messages exchanged via the P2P network. In at least one alternative embodiment, the network addresses are also directly stored inside each trie node.

To establish the node hierarchy illustrated in FIG. 2C via the bootstrapping process, the entire virtual address space is initially assigned to a root node (i.e. node 0x00 in FIG. 2C). Thereafter, whenever an additional node joins, the virtual address space is divided such that it is equally distributed among all of the nodes. First, when node 0x01 joins, it discovers the root node 0x00, and notifies the root node it is joining. The root node 0x00 splits its assigned address space into two, and assigns half of it to node 0x01. The root node 0x00 also annotates the starting address of the portion it handed to 0x01. When node 0x02 joins, it notifies the root node 0x00, and the root node further splits its remaining virtual address space into two portions, handing one of them to node 0x02. When node 0x03 joins, it notifies the root node, and the root node checks the least significant bit of the new node ID (in the case of 0x03, the least significant bit is "1"). In response to determining that the least significant bit is a "1", the root node notifies its right child, i.e. node 0x01. In response, node 0x01 is notified that node 0x03 is joining, and checks the second least significant bit (in the case of 0x03, the second least significant bit is "1"). In response to determining that the second least significant bit is a "1", the node 0x01 attempts to notify its right child. However, since no right child yet exists, it assigns node 0x03 to be its right child, splits its assigned address space, and assigns part of it to node 0x03. The process then continues for each node.

Figure 2D:
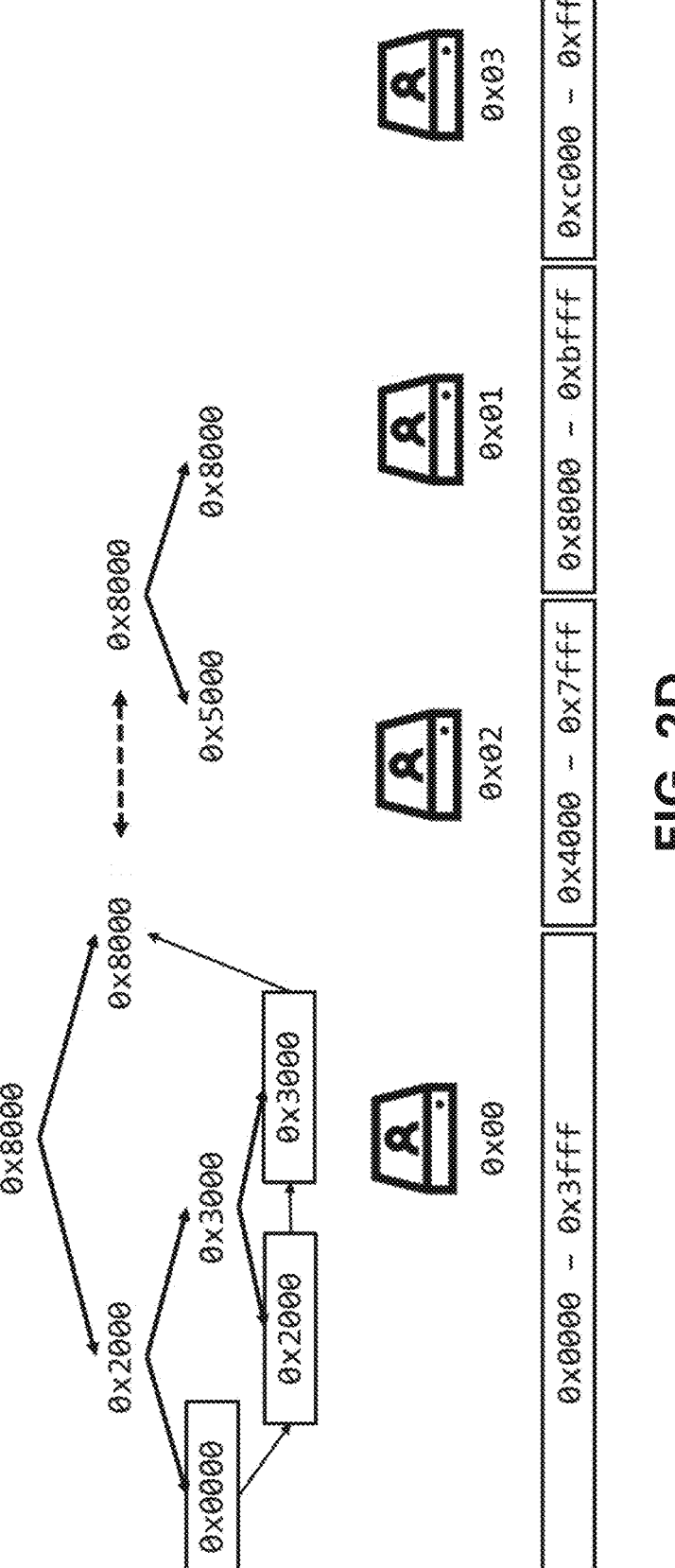
FIG. 2D illustrates a list of allocations of virtual addresses maintained as a local trie that is a subset of a distributed trie, according to certain embodiments of the present disclosure.
Figures 2E, 2F:
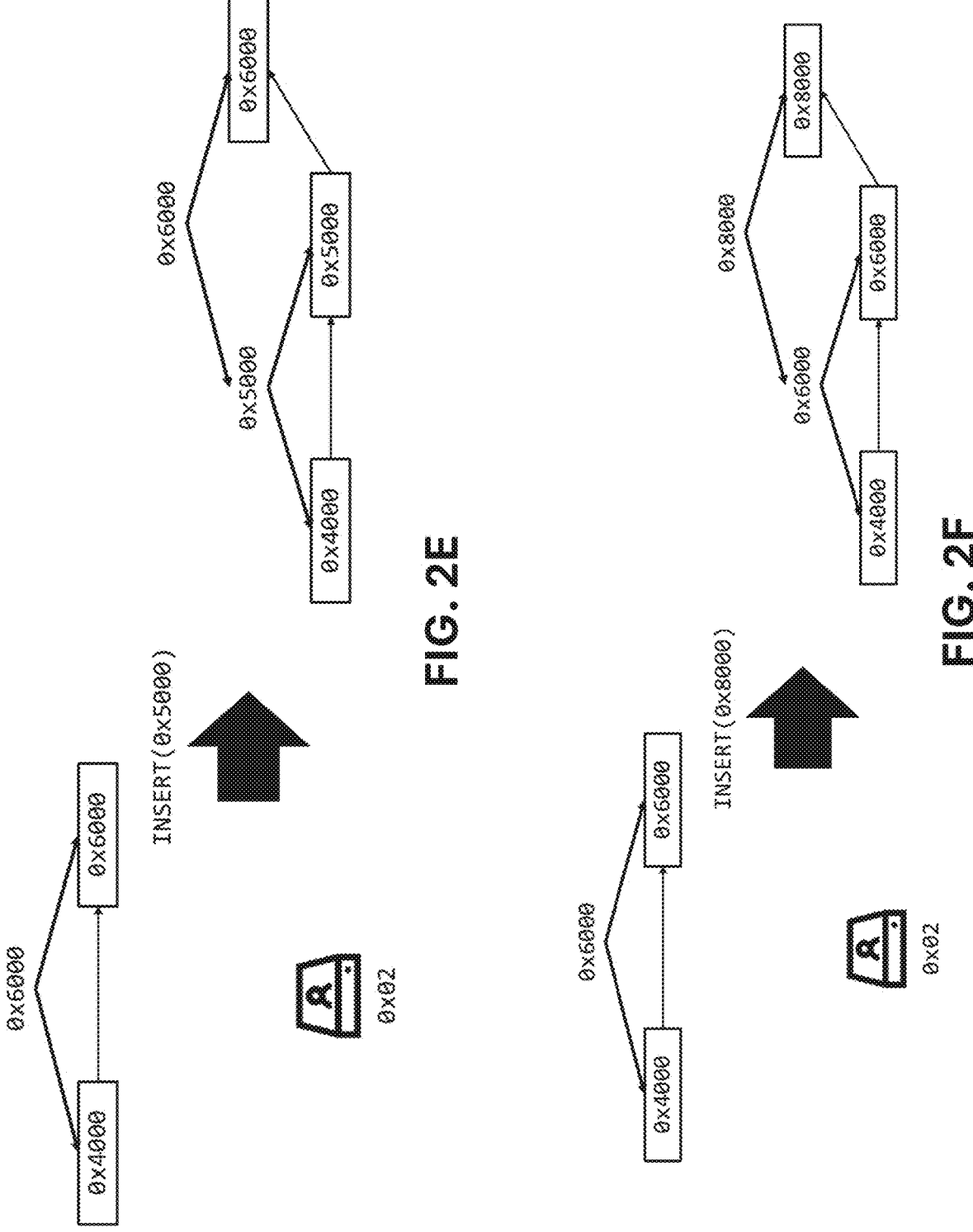
FIGS. 2E and 2F illustrate addition of a new virtual memory allocation in a local trie that is a subset of a distributed trie, according to certain embodiments of the present disclosure.

In this manner, a node hierarchy—which itself forms a trie—is established that includes all of the nodes in the network. During the assignment process, each time the keyspace is split and a portion assigned to new node, the node that performs the splitting keeps its root key (i.e., the virtual address where the range assigned to the node ends). Any virtual address equal or greater than that key will belong to its right child, while any virtual address less than that key will have been either retained or assigned to its left child. Each node in the hierarchy then maintains, as a local trie (which is a subset of the distributed trie), a list of allocations of virtual address in the virtual address range that has been assigned to it. An example is illustrated in FIG. 2D, where the node 0x00 includes a subset of the distributed trie corresponding to virtual addresses less than 0x8000, i.e. for addresses 0x0000 through 0x7fff. Each leaf node of the distributed trie corresponds to a memory allocation. In FIG. 2D, for example, the leaf nodes 0x0000, 0x2000, and 0x3000 each indicates that an allocation of virtual addresses that begins with that virtual address. Anytime a new allocation is added, a new leaf node is added and the trie is updated to accommodate the leaf node while ensuring that each node has at most one parent node and at most two child nodes. FIG. 2E, for example, illustrates the addition of a new virtual memory allocation (beginning at 0x5000) to a trie that previously stored memory allocations for 0x4000 and 0x6000. To add the new virtual memory allocation, the trie is updated locally to replace the leaf node 0x4000 with a parent node 0x5000 and to create new leaf nodes 0x4000 and 0x5000.

In addition to local updates, the trie supports borrowing of virtual memory addresses from other nodes, i.e. to enable a node to allocate virtual memory addresses outside its assigned range. In FIG. 2D, for example, the leaf node 0x8000, which has been marked as "remote," indicates that there is a remote allocation at the node with root 0x8000—in this case node 0x01. Anytime an allocation is added that causes a node's root to update (as illustrated, e.g., in FIG. 2F), a root update message is sent to the node's parent. The node's root key is used to locate existing allocations. If a node wants to locate an allocation to whom a given address belongs, it will first proceed as in the hash table by computing the ID of the node who is supposed to own it, and it will contact such node. However, that key might belong to an allocation caused the node to hand some of its assigned address range. The node will check if that is the case by comparing the key to its root key, and if it is greater or equal to it, it will forward the request to its right child. The same process can be used to locate allocations to be removed or modified.

Figure 3A:
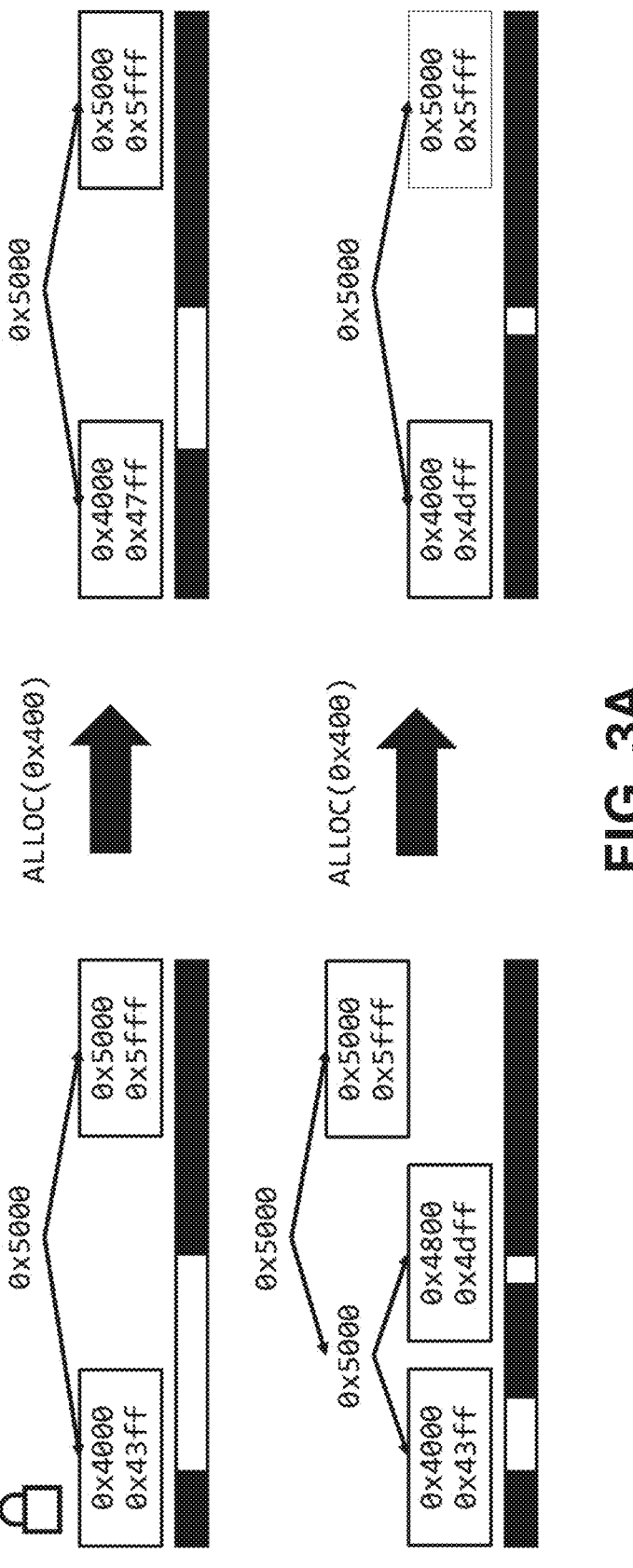
FIG. 3A illustrates an allocation of virtual address space in a distributed trie data structure, according to certain embodiments.

Once the node hierarchy has been established and the memory allocations initialized, a memory manager of a respective node can attempt to allocate memory. If there is enough space locally, the respective node can simply update its local trie to indicate that the virtual address range has been allocated. This is illustrated for two different scenarios in FIG. 3A. In the first scenario, an allocation of 400 bytes is added to an existing 400 byte allocation such that no additional leaf node is added to the local trie (instead, the existing leaf node itself is updated). In the second scenario, an allocation of 400 bytes results in the merger of two prior allocations such that two leaf nodes are replaced by a single leaf node.

Figure 3B:
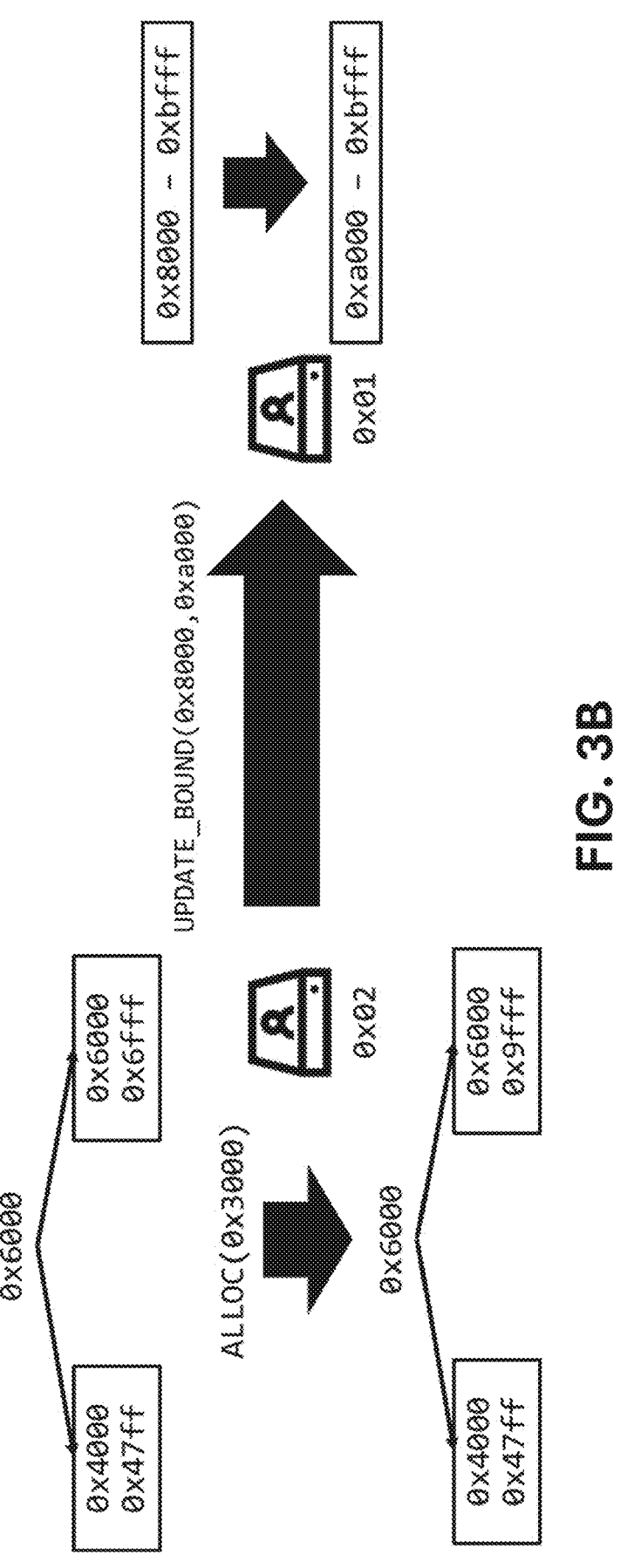
FIG. 3B illustrates an allocation of virtual address space in a distributed trie data structure, according to certain embodiments.

Alternatively, if there is not enough space locally. The respective node can update its local trie to borrow portions of the key space from sibling nodes. For example, if the respective node needs to allocate N bytes but only has M<N bytes available in the virtual address range that has been assigned to it, the respective node can request from a sibling node (or a parent node) a portion of that sibling node's (or parent node's) assigned addresses. There are two situations that may result when a respective node attempts to borrow additional key space: (i) the respective node is a leaf node and (ii) the respective node is not a leaf node. If the respective node is a leaf node, it requests that its parent node expand its leased range. If the parent can lease extra key space (i.e. from the key space assigned to the parent), the allocation succeeds. If the parent node cannot reassign space from its own assigned key space, the parent node tries to locally reassign key space—first by reassigning key space from its other child (if it has one) and second by asking its own parent for extra space. If the respective node is not a leaf node, it first attempts to reclaim space from its left child and then attempts to reclaim space from its right child (if no left child exists or if the left child cannot spare any key space assigned to it). Third, the respective node asks its parent for extra space. An example of this process is illustrated in FIG. 3B, where the node 0x02 allocates a block of 3000 bytes from keyspace that was previously assigned to node 0x01, such that the roots of each of nodes 0x01 and 0x02 are updated.

Figure 3C:
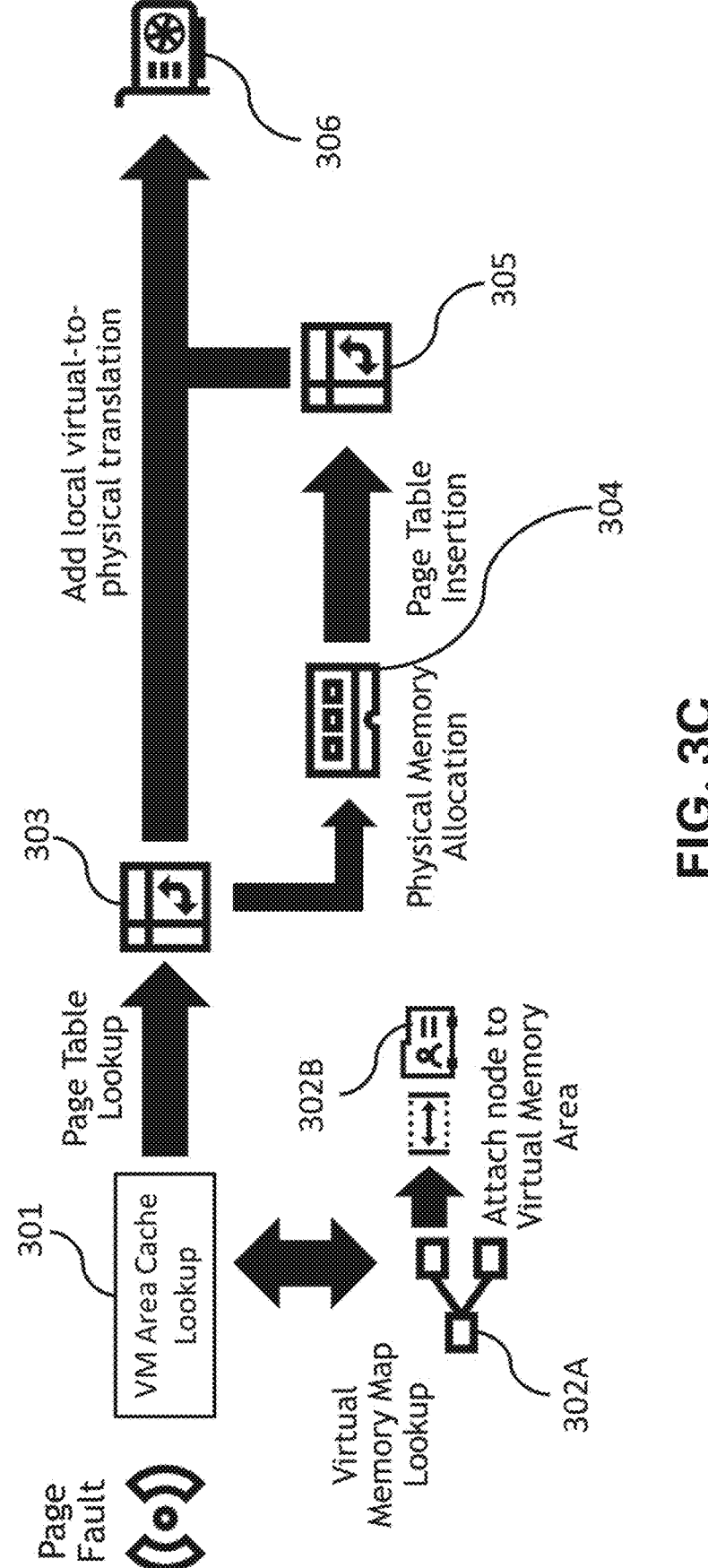
FIG. 3C illustrates a physical memory commit process according to certain embodiments of the present disclosure.

FIG. 3C illustrates a physical memory commit process according to certain embodiments of the present disclosure. The process 300 begins when the operating system of a node of a multi-node computing system receives a page fault in response to an attempt to access a valid physical memory address corresponding to a particular virtual memory address. In order to determine whether the particular virtual memory address is valid, the operating system must determine whether it has been allocated. To do so, the operating system first performs a lookup in its virtual memory area cache at 301. If the operating system identifies a range of allocated virtual addresses that includes the particular virtual memory address, it concludes that the particular virtual memory address is valid and proceeds to 303. If, on the other hand, the operating system fails to identify a range of allocated virtual addresses that includes the particular virtual memory address, it performs a lookup in the distributed trie maintained by the multi-node computing system at 302. The lookup performed at 302 includes first, at 302A, determining whether the allocation status of the particular virtual memory address is stored in the subset of the distributed trie maintained locally by the operating system, and if not, traversing, at 302B, the distributed trie (i.e. by sending one or more messages via the P2P network) to locate the node that is responsible for storing the allocation status of the particular virtual memory address. Upon locating the portion of the distributed trie that stores the allocation status of the particular virtual memory address and determining that it is a validly allocated address (at either 302A or 302B), the process updates the local VMA cache maintained by the operating system and proceeds to 303. If the address is not validly allocated (such that there is no record in the distributed trie of the virtual address having been allocated), a page fault is triggered and forwarded to the OS, which handles the page fault based on its own policies.

At 303, the process performs a page table lookup in the distributed page table to determine whether a physical memory address has previously been mapped to the particular virtual address. If a mapping is identified, the process proceeds to 305 where the operating system adds a virtual-to-physical translation to a locally maintained page table. Alternatively, if no mapping is identified in the distributed page table at 303, the process proceeds to 304 where it performs a physical memory allocation and thereby establish a mapping between the particular virtual address and a physical memory address (i.e. corresponding to the newly allocated physical memory). In performing the physical memory allocation at 304, the process attempts to first allocate physical memory locally, i.e. at the node on which the operating system is running, and if such physical memory is not available, either performs a memory clear out process (e.g. by moving stored data from the memory to a disk) or queries other nodes in the multi-node computing system to identify available physical memory. If other nodes in the system are queried, the operating system queries such other nodes based on their distance from the current node as determined based on the routing table stored locally. Once physical memory corresponding to the virtual memory address has been allocated (following 304), the process proceeds to 305—where a virtual-to-physical translation is added to the locally maintained page table, which is maintained by the OS in kernel space. Thereafter, the process proceeds to 306 where the process that triggered the page fault is allowed to proceed.

Figure 3D:
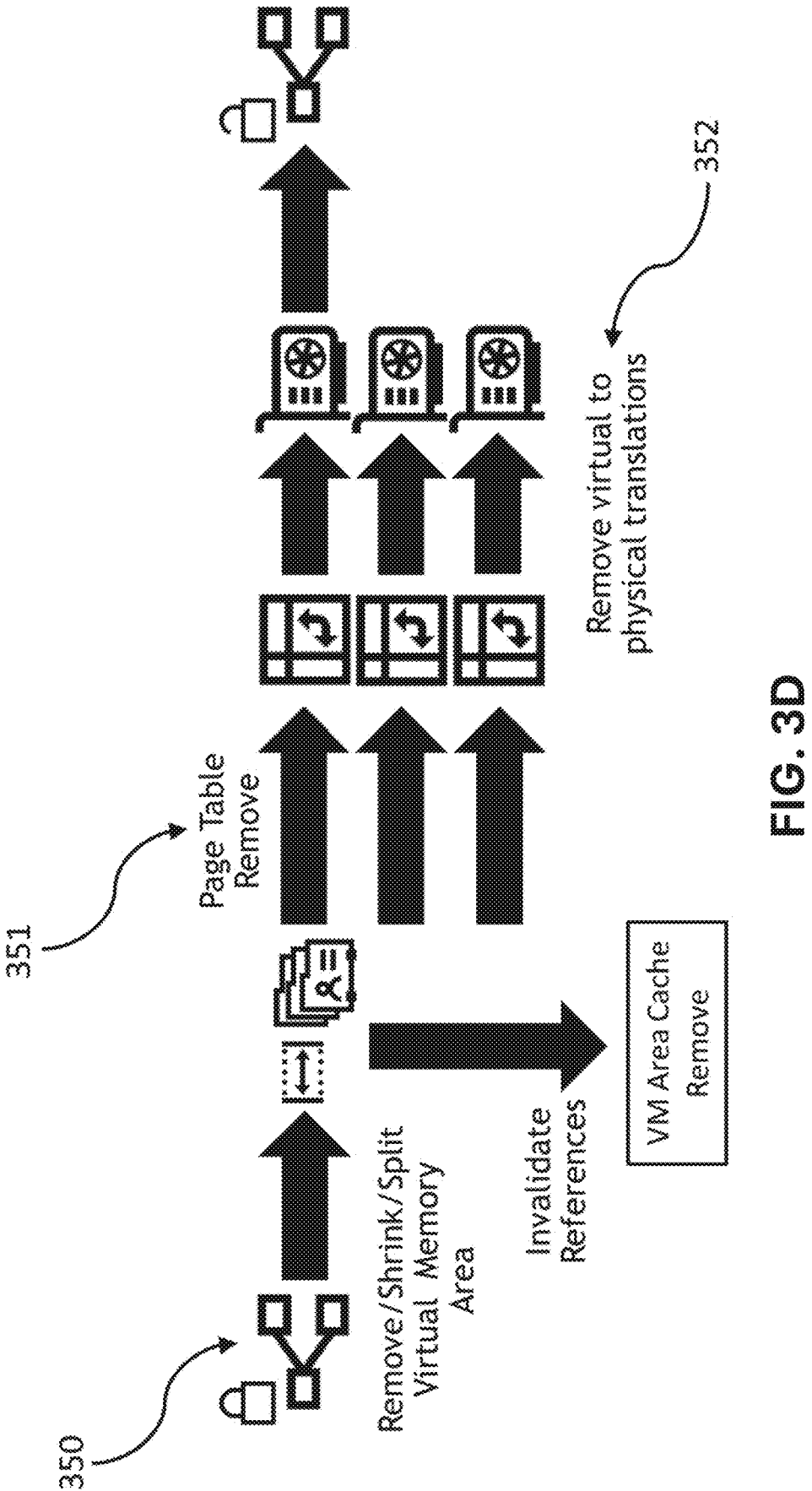
FIG. 3D illustrates a virtual memory modification (e.g. release) process, whereby a particular virtual memory area that has previously been allocated can be unallocated.

FIG. 3D illustrates a virtual memory modification (e.g. release) process, whereby a particular virtual memory area that has previously been allocated can be unallocated. At 350, the process determines which nodes in the multi-node computing system are currently using the virtual memory area. To determine such nodes, the process identifies, via the distributed trie, the node responsible for maintaining the memory allocation status for the particular virtual memory area. To locate such node, the process first queries its own, local portion of the distributed trie and then traverses the trie, as described above, to locate the node. Once the node has been located, the process queries that node for a list of nodes that are currently using the virtual memory area. Such list is maintained as part of that node's subset of the distributed trie. Upon receiving the list of nodes currently using the virtual memory area, the process instructs those nodes, at 351, to remove references to the virtual memory area from their local VMA caches and to remove translations from that virtual memory area to physical memory addresses from their local page tables. In addition, the process instructs, at 352, the node responsible for maintaining the virtual address to physical address translations for the virtual memory area to remove such translations from the distributed page table and the node responsible for maintaining the allocation status for the virtual memory area to remove such allocations from the distributed trie.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4:
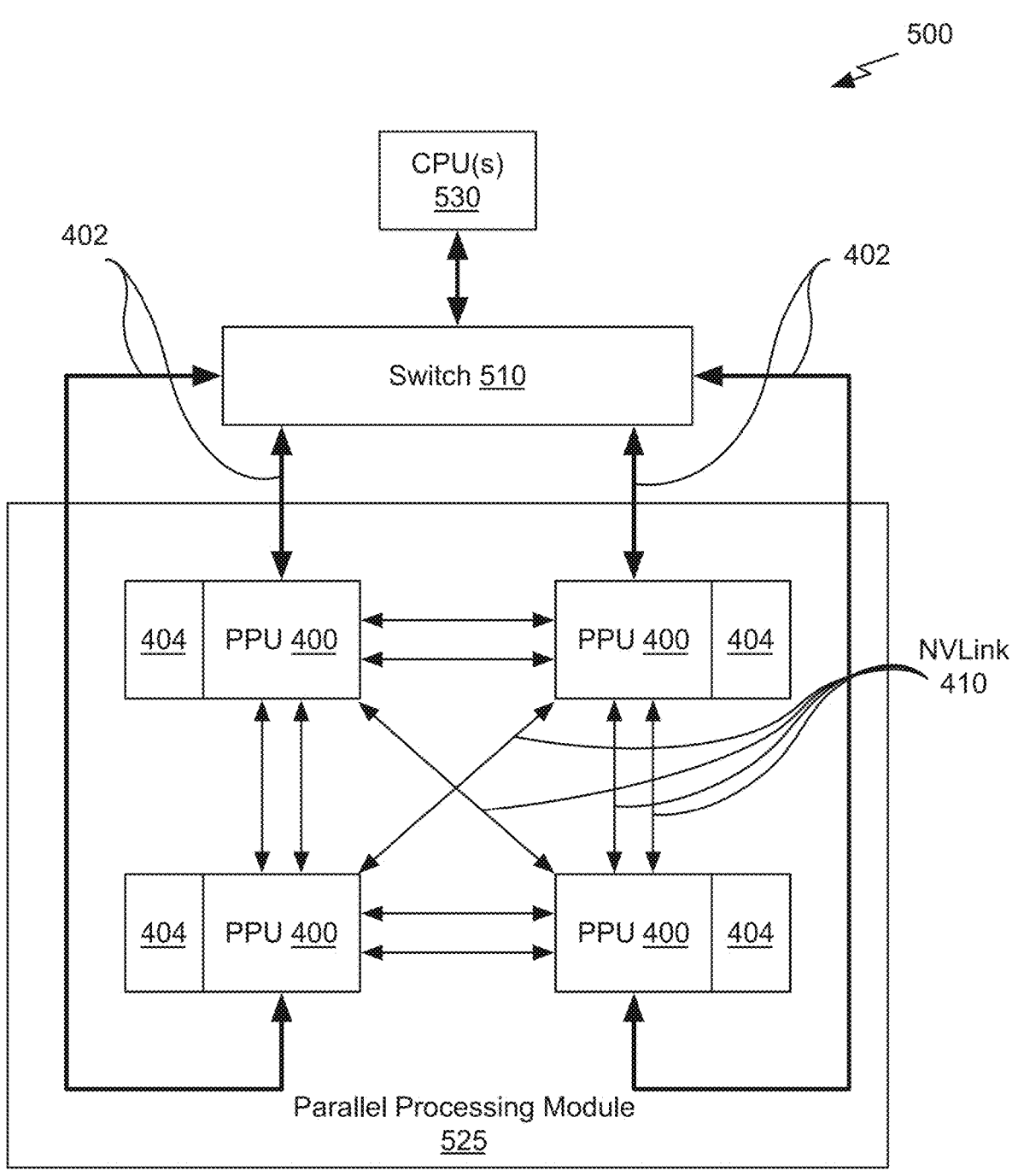
FIG. 4 is a conceptual diagram of a processing system implemented using a PPU, suitable for use in implementing some embodiments of the present disclosure.

FIG. 4 is a conceptual diagram of a processing system 500 implemented using multiple PPUs 400, in accordance with an embodiment. The exemplary system 500 may utilized as a particular node—or portion thereof—in the above-described multi-node computing systems. In addition to the multiple PPUs 400, the processing system 500 includes a CPU 530, switch 510, and respective memories 404 for the PPUs 400.

Each parallel processing unit (PPU) 400 may include hundreds or thousands of cores that are capable of handling hundreds or thousands of software threads simultaneously. The PPUs 400 may generate pixel data for output images in response to rendering commands (e.g., rendering commands from the CPU(s) 530 received via a host interface). The PPUs 400 may include graphics memory, such as display memory, for storing pixel data or any other suitable data, such as GPU data. The display memory may be included as part of the memory 404. The PPUs 400 may include two or more GPUs operating in parallel (e.g., via a link). The link may directly connect the GPUs (e.g., using NVLINK 410) or may connect the GPUs through a switch (e.g., using switch 510). When combined together, each PPU 400 may generate pixel data or GPGPU data for different portions of an output or for different outputs (e.g., a first PPU for a first image and a second PPU for a second image). Each PPU 400 may include its own memory 404, or may share memory with other PPUs 400.

The PPUs 400 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The NVLink 410 provides high-speed communication links between each of the PPUs 400. Although a particular number of NVLink 410 and interconnect 402 connections are illustrated in FIG. 4, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 4, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 4, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

Figure 5A:
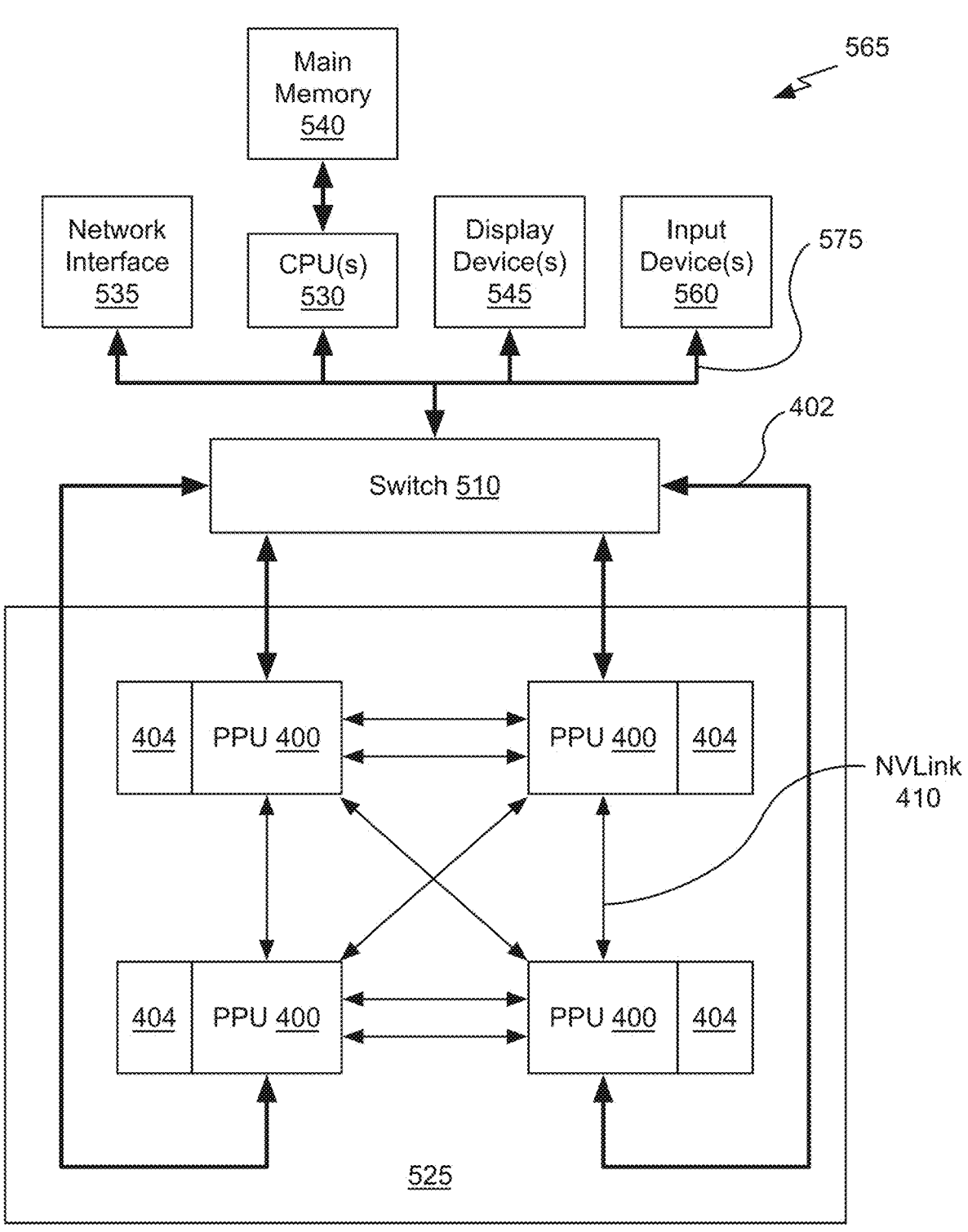
FIG. 5A illustrates an exemplary system in which the various architecture and/or functionality of the various previous embodiments may be implemented.

FIG. 5A illustrates an exemplary system 565 in which the various architecture and/or functionality of the various previous embodiments may be implemented. The exemplary system 565 may be configured to implement the method 300 shown in FIG. 3.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5A are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5A is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5A.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 4 and/or exemplary system 565 of FIG. 5A—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 4 and/or exemplary system 565 of FIG. 5A. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes (e.g., neurons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5B:
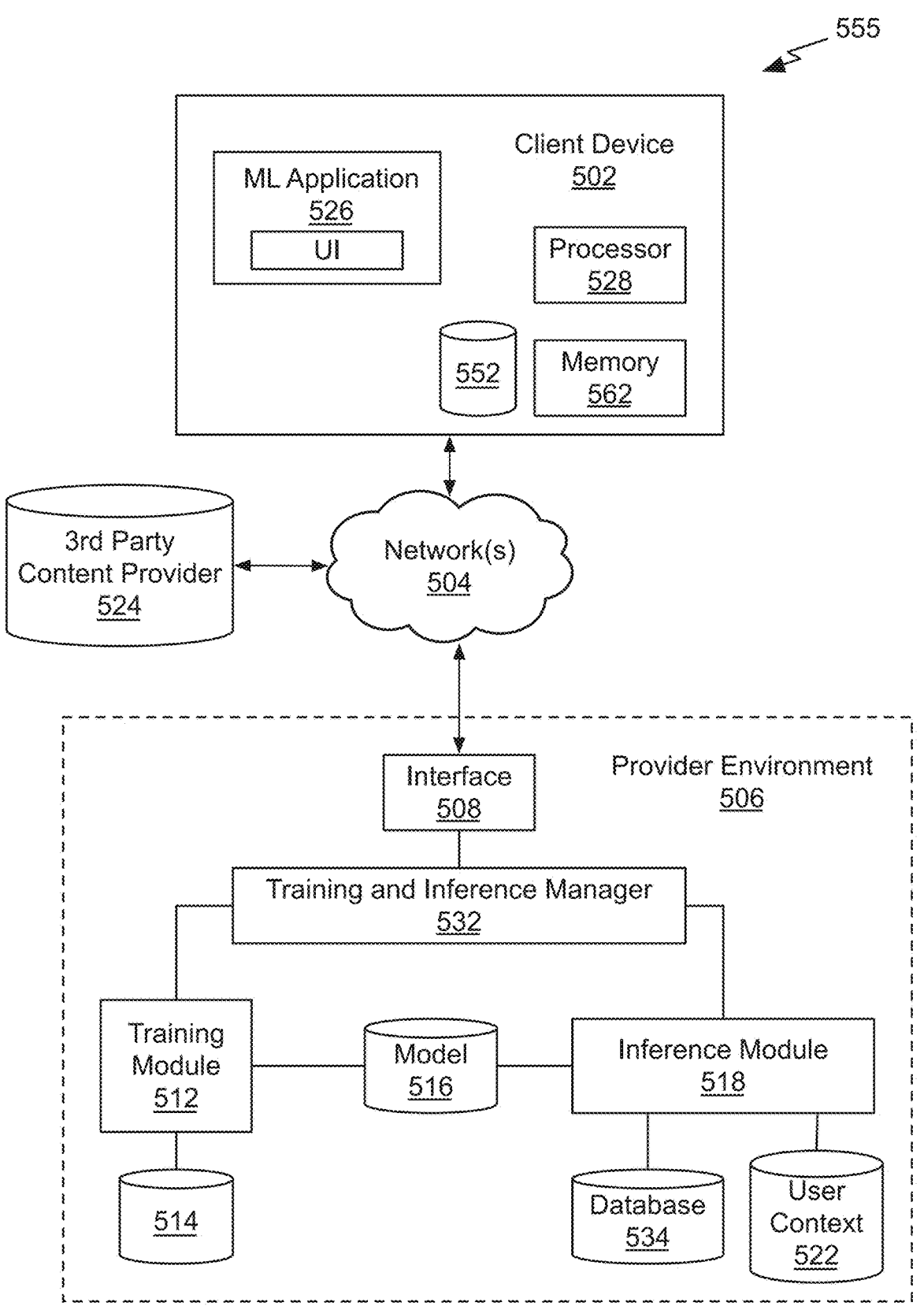
FIG. 5B illustrates components of an exemplary system that can be used to train and utilize machine learning, in at least one embodiment.

FIG. 5B illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506. In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
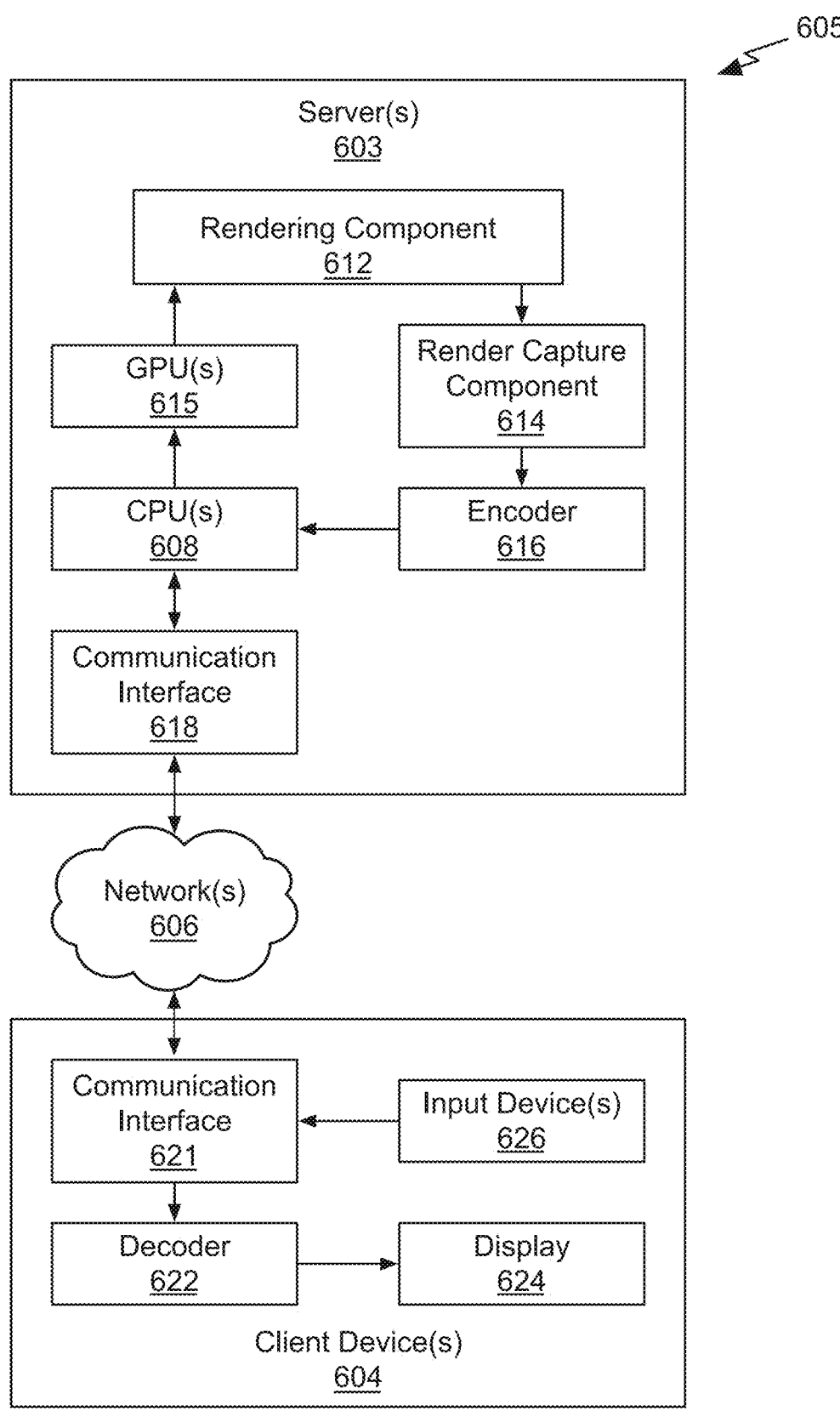
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 4 and/or exemplary system 565 of FIG. 5A), client device(s) 604 (which may include similar components, features, and/or functionality to the example processing system 500 of FIG. 4 and/or exemplary system 565 of FIG. 5A), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

The arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. Various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A multi-node computing system configured to maintain a shared virtual address space, the multi-node node computing system comprising:

a plurality of nodes, each respective node of the plurality of nodes comprising:

processing circuitry configured to:

maintain a respective subset of a distributed page table, the distributed page table providing a mapping of virtual addresses of the shared virtual address space to physical memory locations of a distributed physical memory, maintain a respective subset of a distributed virtual memory map, the distributed virtual memory map providing, for each respective virtual address in the shared virtual address space, an indication of whether the respective virtual address is in use or available, and maintain a routing table storing a node ID and a network address of at least one other node of the plurality of nodes; and memory configured to store the respective subset of the distributed page table and the respective subset of the distributed virtual memory map.

2. The multi-node computing system according to claim 1, wherein the distributed page table is a distributed hash table and the distributed virtual memory map is a distributed trie.

3. The multi-node computing system according to claim 2, wherein the respective subset of the distributed hash table and the respective subset of the distributed trie are maintained by a kernel-level component of an operating system of the respective node, and wherein the respective subset of the distributed page table and the respective subset of the distributed memory map are stored in a kernel space of the memory.

4. The multi-node computing system according to claim 2, wherein the plurality of nodes are arranged in a hierarchy established during an initialization stage of a process for creating the distributed trie.

5. The multi-node computing system according to claim 4, wherein each node of the plurality of nodes has, in the hierarchy, a single parent node and no more than two child nodes.

6. The multi-node computing system according to claim 1, wherein the distributed physical memory comprises physical memory of each respective node of the plurality of nodes.

7. The multi-node computing system according to claim 1, wherein the processing circuitry configured to maintain the subset of the distributed page table and the subset of the distributed memory map is a central processing unit (CPU).

8. The multi-node computing system according to claim 7, each respective node of the plurality of nodes further comprising a network interface, the multi-node computing system further comprising a network switch configured to interconnect CPUs of different respective nodes.

9. The multi-node computing system according to claim 6, wherein the CPUs of the different respective nodes are configured to communicate via a peer-to-peer (P2P) network, each respective CPU being configured to communicate with other CPUs using network addresses stored in the respective routing table corresponding to the respective CPU.

10. The multi-node computing system according to claim 1, each respective node of the plurality of nodes comprising a plurality of graphics processing units (GPUs).

11. The multi-node computing system according to claim 10, further comprising a GPU interconnect switch configured to interconnect GPUs of different respective nodes.

12. A computing node for a multi-node computing system configured to maintain a shared virtual address space, the computing node comprising:

a central processing unit (CPU), configured to:

maintain a respective subset of a distributed page table, the distributed page table providing a mapping of virtual addresses of the shared virtual address space to physical memory locations of a distributed physical memory, maintain a respective subset of a distributed memory map, the distributed memory map providing, for each respective virtual address in the shared virtual address space, an indication of whether the respective virtual address is in use or available, and maintain a routing table storing a node ID and a network address of at least one other node of the plurality of nodes; and a network interface configured to communicate with a CPU of at least one additional computing node of the multi-node computing system.

13. The computing node according to claim 12, wherein the distributed page table is a distributed hash table and the distributed virtual memory map is a distributed trie.

14. The computing node according to claim 13, wherein the respective subset of the distributed hash table and the respective subset of the distributed trie are maintained by a kernel-level component of an operating system of the respective node, and wherein the respective subset of the distributed page table and the respective subset of the distributed memory map are stored in kernel space.

15. The computing node according to claim 12, wherein the CPU is configured to construct the routing table via a bootstrapping process, the bootstrapping process comprising:

broadcasting a master node identity request message;

receiving a message indicating a routing address and a node ID of a master node;

computing a distance to the master node; and storing, in the routing table and based on the distance to the master node, the routing address and the node ID of the master node.

16. The computing node according to claim 12, further comprising a plurality of graphics processing units (GPUs), wherein the plurality of GPUs are interconnected via GPU interconnects.

17. The computing node according to claim 16, wherein the plurality of GPUs are configured to be further interconnected to GPUs of at least one additional computing node.

18. A method for providing a shared virtual address space for a multi-node computing system including a plurality of nodes, each respective node of the plurality of nodes including one or more processors and a respective physical memory, the method comprising:

providing a first distributed data structure, the first distributed data structure being configured to maintain a mapping of virtual addresses of the shared virtual address space to physical memory locations in a shared physical memory; and providing a second distributed data structure, the second distributed data structure being configured to store, for each virtual address in the shared virtual address space, an indication of whether the respective virtual address is in use or available, wherein the providing the first distributed data structure comprises assigning, to each respective node of the plurality of nodes, a respective subset of the first distributed data structure, and wherein the providing the second distributed data structure comprises assigning, to each respective node of the plurality of nodes, a respective subset of the second distributed data structure.

19. The method according to claim 18, wherein the first distributed data structure is a shared page table in the form of a distributed hash table and the second distributed data structure is a shared memory map in the form of a distributed trie.

20. The method according to claim 19, wherein each respective subset of the distributed hash table is maintained by a kernel-level component of an operating system of the respective node to which the respective subset of the distributed hash table is assigned, and wherein each respective subset of the distributed trie is maintained by a kernel-level component of an operating system of the respective node to which the respective subset of the distributed trie is assigned.

* * * * *